March 27, 1934.  F. C. WAPPLER  1,952,617
METHOD AND MEANS FOR SURGICAL RESECTION
Filed Aug. 24, 1931  4 Sheets-Sheet 1
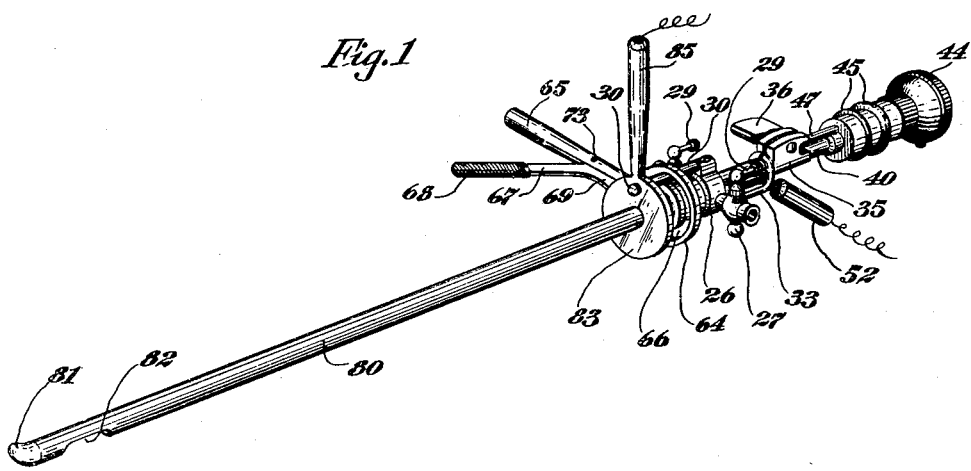
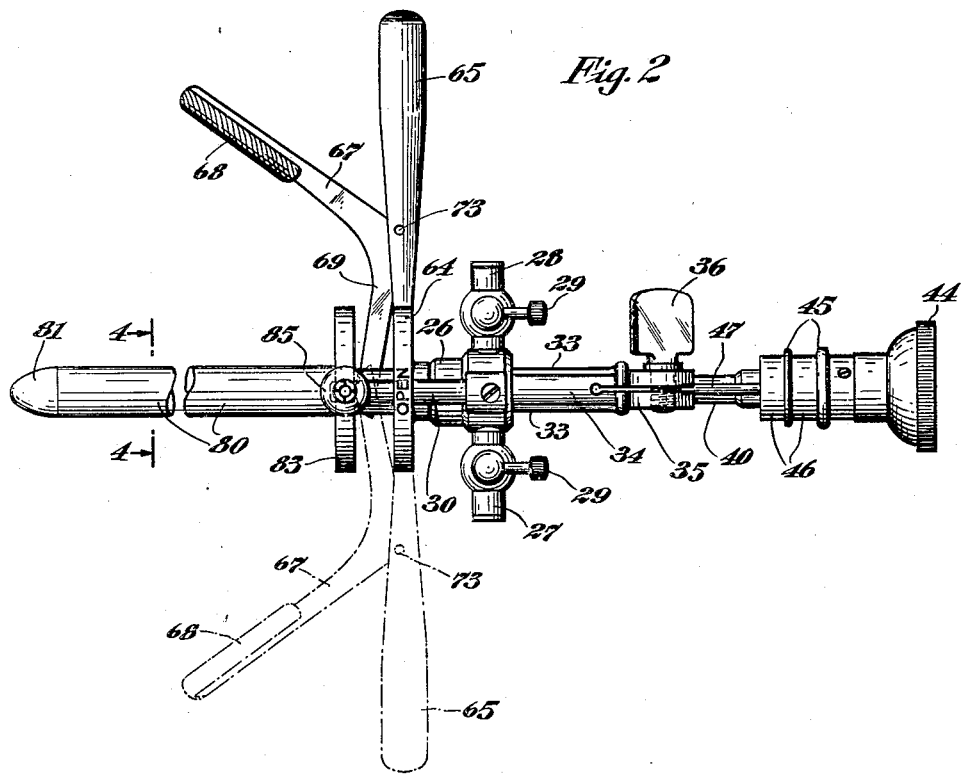
INVENTOR
Frederick Charles Wappler,
BY
ATTORNEY March 27, 1934.   F. C. WAPPLER   1,952,617
METHOD AND MEANS FOR SURGICAL RESECTION
Filed Aug. 24, 1931   4 Sheets-Sheet 2
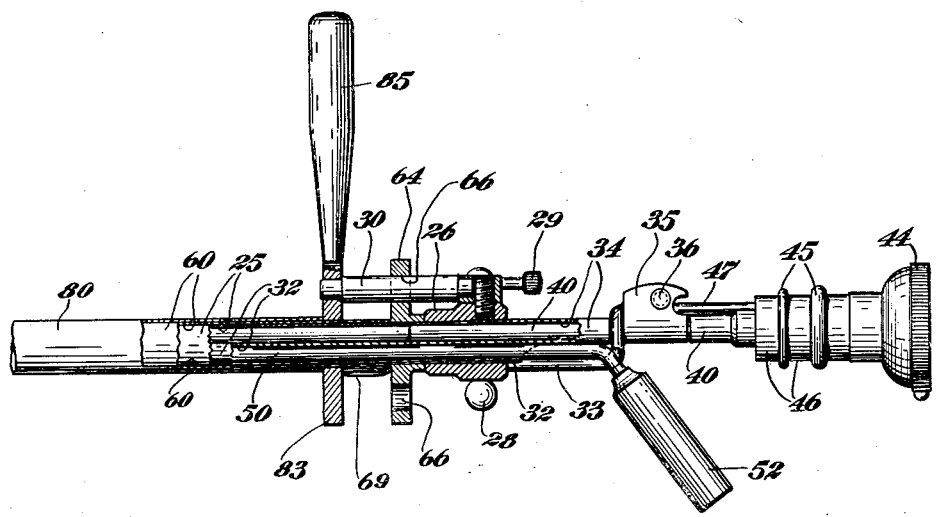
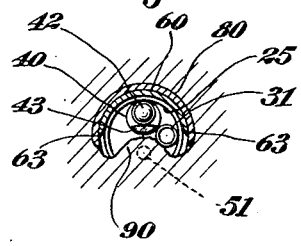
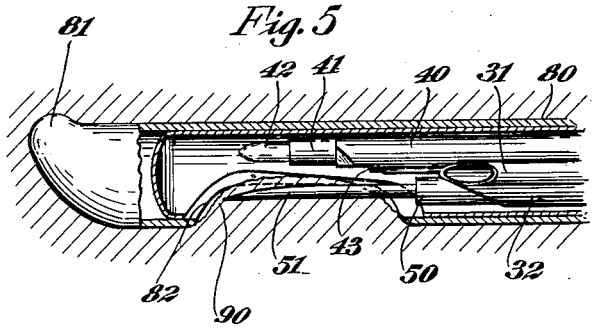
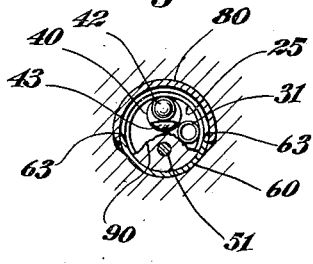
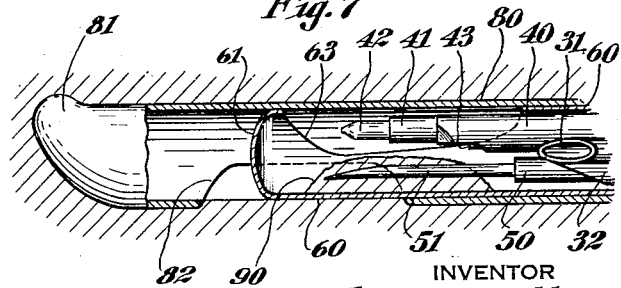

March 27, 1934.  F. C. WAPPLER  1,952,617
METHOD AND MEANS FOR SURGICAL RESECTION
Filed Aug. 24, 1931  4 Sheets-Sheet 3
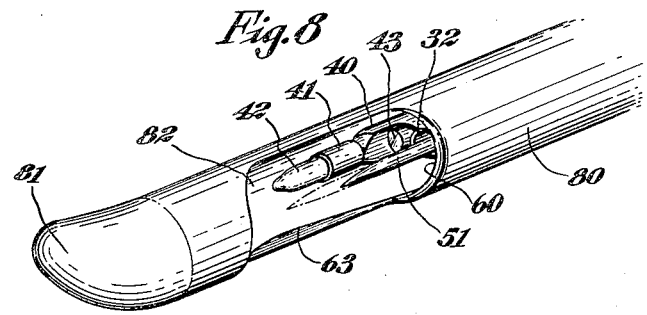
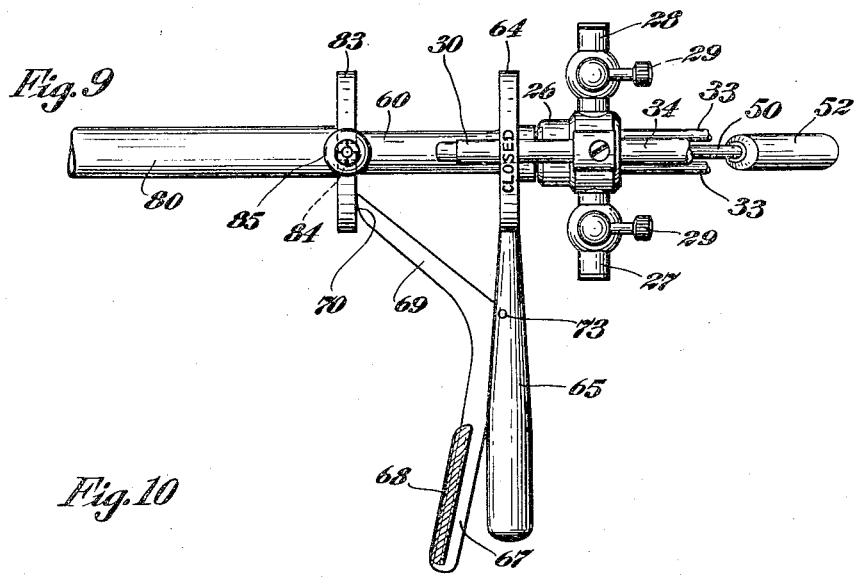
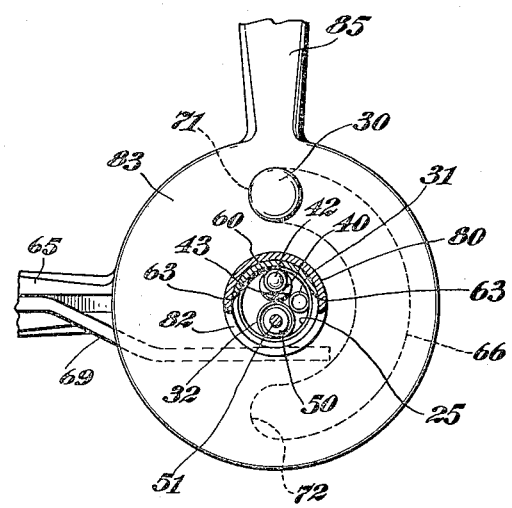
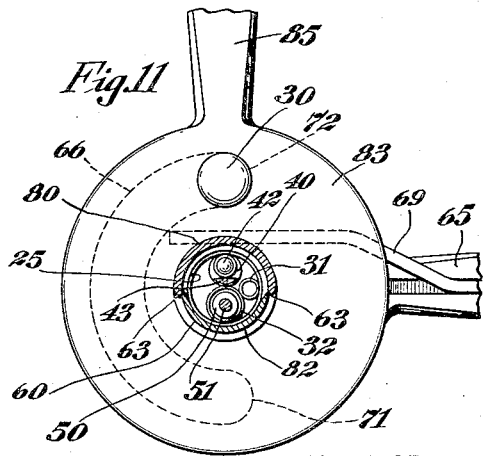
INVENTOR
Frederick Charles Wappler,
BY
ATTORNEY March 27, 1934.  F. C. WAPPLER  1,952,617
METHOD AND MEANS FOR SURGICAL RESECTION
Filed Aug. 24, 1931  4 Sheets-Sheet 4
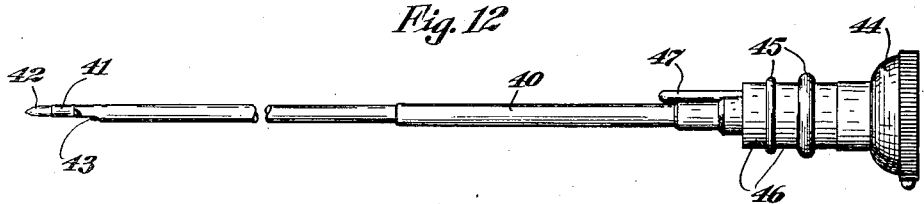
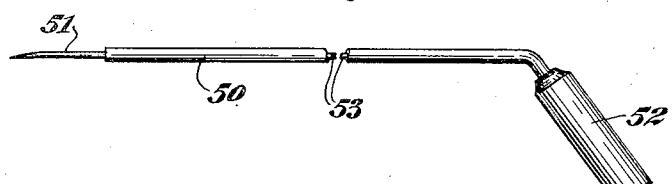
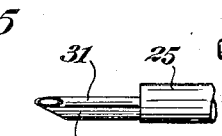 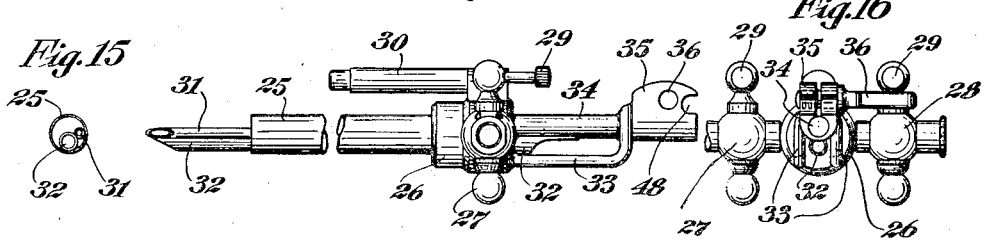
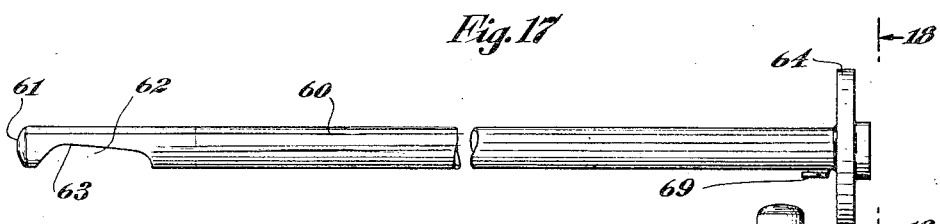
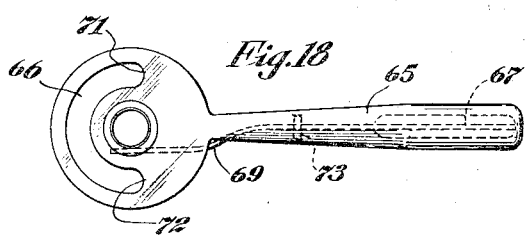
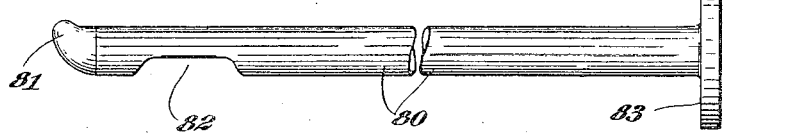
INVENTOR
*Frederick Charles Wappler*
BY
*Frederick Breitenfeld*
ATTORNEY Patented Mar. 27, 1934

1,952,617

UNITED STATES PATENT OFFICE 1,952,617

METHOD AND MEANS FOR SURGICAL RESECTION

Frederick Charles Wappler, New York, N. Y.

Application August 24, 1931, Serial No. 558,938

16 Claims. (Cl. 128—303)

My present invention relates generally to surgery, and has particular reference to a method of surgical resection and, simultaneously, to a resecting surgical instrument of unique characteristics and capabilities.

My invention is directed primarily toward the alleviation of ailments due to protrusions, such as tumor masses or the like, in body cavities. As an example of the uses to which my present method and instrument are particularly adapted, protrusions at the deep urethra or bladder neck, caused for example by enlargement or ailments of the prostate gland, are typical. It will be understood, however, that my present method and instrument, and the several distinctive features and characteristics thereof, are capable of a wide variety of uses and applications and are by no means restricted to the treatment of obstructions or the like in the urethra. At a matter of fact, the uses to which my method and instrument may be applied are highly varied, and the features herein to be described and illustrated by way of example are severally and collectively applicable to a wide variety of purposes and for the treatment of a highly varied set of conditions and ailments of the general character for which my invention has been made.

Generally speaking, my invention has for its comprehensive object the treatment, under illuminated vision and, preferably, under return-flow irrigation, of protrusions in body cavities; and, more especially, my invention is primarily directed toward a treatment which will result in the elimination of such protrusions.

In the embodiment herein illustrated and hereinafter to be described by way of illustration, I have provided a method and means for treating such protrusions in a manner whereby they are eliminated or alleviated by resection or excision.

One of the main features of my invention lies in the provision of a method and means for effecting an excision in a direction substantially transverse to the cavity axis in which the protrusion exists. With this object in view, it is a specific feature of my invention to provide a cutting instrumentality, preferably though not necessarily in the form of a knife, whose construction and arrangement is such that after the protrusion, or any part thereof, has been engaged, as, for example, within the fenestra of an endoscopic tube, the engaged mass may be cut or excised from the cavity wall by a transverse movement or " swipe " of the cutting instrumentality.

Another feature of my invention lies in the provision of a method and means for facilitating the rearward withdrawal, out of the cavity, of such protrusions or parts thereof as have been excised in the manner mentioned.

A particular feature of my invention lies in the provision of a method and means for treating a cavity protrusion in situ for the purpose of " cooking " the same, it being understood that the use of the term " cooking " implies a treatment which is distinct from a mere heating, as in diathermy, and also distinct from a burning or searing, as in cauterization, the treatment which I have referred to as " cooking " being one whereby the tumor mass or the like is coagulated. One typical and convenient method of accomplishing this " cooking " is by the employment of an electric current, usually a high-frequency current, which is caused to pass through the mass to be treated with the result that the mass is bloodlessly coagulated, a mode of treatment which is by itself no longer new in the surgical art.

A further feature of my invention lies in the provision of a method and means for accomplishing a cooking of the protrusion to be treated prior to or during its excision in the manner hereinbefore mentioned, the actual removal or cutting away of the protrusion being thereby greatly facilitated and being rendered practically, if not entirely, bloodless.

It is a particular feature of my invention to provide a method and means for impaling the protrusion to be treated; more especially, by means of an impaling instrumentality adapted to pierce the protrusion, preferably in a direction longitudinal with respect to the cavity axis; and in the preferred embodiment of my invention, the impaling of the protrusion is a step preliminary to the subsequent treatment thereof.

A still further feature of my invention lies in providing a method and means for causing the cooking of the protrusion to be effected by means of the impaling instrumentality. For example, I have illustrated and shall hereinafter describe a method and instrument whereby the impaling member constitutes an electrode through which an electric current of proper characteristics is adapted to pass.

In general, it is an object of my invention to provide a method of treatment, and a particular type of surgical instrument, which is not only simple and reliable but which is highly efficacious in fulfilling its contemplated functions and objects; and with respect to the instrument itself, it is an object to provide a compact and workmanlike mechanism capable of production in a practical and commercial manner; adapted to be expeditiously constructed, assembled, adjusted, and manipulated; and embodying in an efficient manner the capabilities and characteristics which my general objectives necessitate.

I achieve the foregoing objects and advantages, and such other objects and advantages as may hereinafter appear or be pointed out, in the manner illustratively exemplified in the accompanying drawings, wherein—

Figure 1 is a perspective view of an instrument constructed in accordance with my present invention;

Figure 2 is an enlarged plan view of the instrument with a portion broken away for the sake of compactness;

Figure 3 is an enlarged elevational view of the rear portion of my instrument, portions being broken away and other portions being shown in section;

Figure 4 is a cross-sectional view taken substantially along the line 4—4 of Figure 2, showing one of the first steps of manipulation when my instrument is used;

Figure 5 is an enlarged elevational cross-section of the instrument, in situ, showing a further procedural step;

Figure 6 is a view similar to Figure 4, showing a succeeding procedure;

Figure 7 is a view similar to Figure 5, showing one of the final steps of the preferred method of use;

Figure 8 is an enlarged perspective view of the forward end of my instrument with the parts in normal relationship prior to use;

Figure 9 is an enlarged fragmentary plan view similar to Figure 2, showing an adjusted relationship of parts and illustrating one of the features of operation;

Figures 10 and 11 are cross-sectional views taken substantially along the line 4—4 of Figure 2 and illustrating another feature of operation;

Figure 12 is an elevational view of the telescopic tube by itself;

Figure 13 is an elevational view of the impaling instrumentality by itself;

Figure 14 is an elevational view of the inner tube with which the telescope and impaler of Figures 12 and 13 are adapted to be associated;

Figure 15 is a fragmentary end view of Figure 14 taken from the left;

Figure 16 is an end view of Figure 14 taken from the right;

Figure 17 is an elevational view of a preferred form of cutting instrumentality by itself;

Figure 18 is an end view taken substantially along the line 18—18 of Figure 17; and Figure 19 is an elevational view of the outer endoscopic tube by itself.

I shall describe the parts entering into the complete assembly of the instrument illustrated in the order in which the parts would be assembled when used. I shall therefore refer first to Figures 14—16 which illustrate the innermost permanent assembly of parts.

A tube 25 is provided at its rear end with a collar 26 upon opposite sides of which the petcocks 27 and 28 are mounted, each provided with a control handle 29 of conventional character. The collar 26 also carries a forwardly projecting pin 30 which parallels the tube 25 and is disposed slightly above the latter for a purpose presently to be described.

Within the tube 25, and preferably along one lateral side thereof, is permanently arranged a relatively small irrigation tube 31 which projects from the forward end of the tube 25 and which is in communication, at its rear or inner end, with one of the petcocks, preferably the petcock 27.

Arranged within the tube 25 and alongside of the tube 31, preferably along the bottom wall of the tube 25, is a second tube 32 projecting from the forward end of the tube 25 and serving as a guiding conduit for the impaling instrumentality of Figure 13. The rear end of the tube 32 projects rearwardly beyond the collar 26 by a slight amount, and is disposed between two wire-like brackets 33 extending rearwardly in substantially parallel relationship from the collar 26.

The unoccupied remaining space within the tube 25 merges at the rear end with a rearwardly extending tube 34 which is adapted snugly to accommodate the telescope device of Figure 12. The rear end of the tube 34 terminates, preferably, in a clamping arrangement 35 of any suitable character, preferably provided with a clamping screw 36. As a matter of convenience, the rear ends of the brackets 33 are secured to the rear portion of the tube 34.

The remaining petcock, preferably the one herein designated 28, is in direct communication with the unoccupied space within the tube 25, whereby irrigation is provided in such a manner that the irrigating fluid may flow through the petcock 27 and tube 31 to the area under treatment, returning rearwardly through the tube 25 and out of the petcock 28.

The telescope device of Figure 12 is preferably of the character more fully illustrated and described in the Wappler Patent No. 1,680,491, and consists essentially of an elongated tube 40 at the forward end of which an attenuated extension 41 is provided for the purpose of supporting a miniature lamp 42. Immediately behind the extension 41 and within the tube 40 is a specially constructed lens 43, the exposed portion of which is adapted to command a conical field of vision lying obliquely forwardly thereof and thoroughly illuminated by the lamp 42.

At the rear end of the tube 40 is the conventional eyepiece 44. Rings or flanges 45 of insulating material separate and define the circular bands 46 of conductive material through which the necessary electrical connections for the lamp 42 may be made. The telescope preferably, though not necessarily, is provided with the forwardly projecting pin 47 adapted to rest within the notch 48 of the clamping arrangement 35 when the telescope is associated with the tube 25 of Figure 14 by inserting it forwardly through the clamp 35 and the tube 34.

After assembly, the forward end of the telescope projects from the forward end of the tube 25, lying closely alongside of the tubes 31 and 32, but the objective lens 43 being ahead of these tubes so as to command a free and unobstructed illuminated view of the area or protrusion to be treated.

The impaling instrument of Figure 13 consists essentially of an elongated tube 50 having a pointed forward end 51 and an enlarged obliquely extending handle 52 at its rear end. In the embodiment herein illustrated, this impaling device serves as one electrode of the electric cooking mechanism, and for this reason it is preferable to make the tube 50 and the handle 52 of insulated material, the end 51 being conductive of electric current and being electrically connected through the tube 50, as indicated at 53, with a suitable electric terminal within the handle 52, this terminal being, for example, of sleeve-like character adapted to receive a rod-like terminal from the current source. The connection is preferably made by inserting such rod-like terminal (not shown) into the rear end of the handle 52.

The device of Figure 13 is associated with the assembly of Figure 14 by inserting it forwardly through the tube 32. It is longitudinally adjustable within this tube to permit the impaling of the protrusion to be effected; and when advanced forwardly to its fullest extent, the impaling end 51 lies well within the field of vision of the telescope 40. At this time, the angular portion immediately in advance of the handle 52 lies snugly between the brackets 33, and, in this way, rotation of the impaling device is prevented, as shown most clearly in Figure 3.

With the parts of Figures 12–16 assembled in the manner described, the tube 25 is snugly insertable into the cutting tube of Figure 17.

The cutting instrumentality herein illustrated by way of example consists of the tube 60 having a closed forward end 61 and a laterally opening fenestra 62, the opposite edges 63 of which are of highly sharpened steel or the like.

At its rear end, the tube 60 is provided with the flange 64 upon which a laterally extending handle 65 is provided. The flange 64 has an annular slot 66 cut through it and extending through an angle of at least 180°. Preferably, this slot is arranged on the side of the flange 64 opposite to that upon which the handle 65 is mounted.

Pivoted to the forward side of the handle 65, as illustrated most clearly in Figures 2 and 9, is an angular member shaped like a bellcrank. This member is pivoted to the handle 65 at its midportion as at 73, one arm 67 extending outwardly alongside of the handle 65 and provided with the knurled hand grip portion 68. The other arm 69 of this pivoted member has a curved forward edge 70, and is bent into the offset relationship illustrated most clearly in Figure 18 so that the free end 70 will clear the tube 60 during pivotal movements.

The tube 60 is of such a length that when the assembly of the parts of Figures 12–16 is inserted into the tube 60, the forward ends of all the operative parts will be disposed within the fenestrated forward portion of the tube 60. When this assembly is accomplished, the pin 30 is adapted to project through the arcuate slot 66, as a result of which manipulation of the handle 65 enables the tube 60 to be rotated with respect to the tube 25 through an angle of approximately 180°. The amount of this rotation is limited by the two ends 71 and 72 of the slot 66, these ends encountering the pin 30, which serves as a stop.

The outer member of the entire device is illustrated in Figure 19 and consists of an endoscopic tube 80 having a closed forward end or nose piece 81 and a lateral fenestra 82. At the rear end, the tube 80 is provided with the flange 83 through which a hole 84 is bored paralleling the axis of the tube 80. The flange 83 also carries a laterally projecting arm 85 which is adapted to serve as an electric terminal, similar to the terminal provided in the handle 52. An electrical connection made to the terminal 85 places the entire endoscopic tube 80 and all the conductive parts with which it is associated in electrical connection with the electric circuit with which the connection is made.

When the assembly previously described, including the cutting tube 60, is inserted into the endoscopic tube 80, which insertion is capable of accomplishment in a snug manner, the operative forward parts of the several instrumentalities are disposed within the opening defined by the fenestra 82. Furthermore, the forward end of the pin 30 engages snugly within the opening 84 and thereby locks the endoscopic tube 80 in an unrotatable relationship with respect to the tube 25 and the portions associated with the latter.

The tube 60 is still rotatable, however, by manipulation of the handle 65, and the parts are so constructed that when the handle 65 is in the full-line position of Figure 2, the fenestra 62 of the cutting tube is in substantial registry with the fenestra 82 of the endoscopic tube 80. In this relationship of parts, the word "Open", which may for convenience be inscribed upon the edge of the flange 64, aligns itself with the binding post or arm 85 and thereby indicates to the operator that the fenestrae 62 and 82 are in registry. This relationship of parts is illustrated most clearly in Figures 4 and 10; and, at this time, the end 71 of the slot 66 is in abutment with the pin 30. When the arm 65 is swung from the full-line position of Figure 2 to the dot-and-dash position of this figure, one of the cutting edges 63 of the cutting tube sweeps transversely across the fenestra 82 until the cutting tube is in the position most clearly illustrated in Figures 6 and 11, at which time the end 72 of the slot 66 abuts against the pin 30. At this time, the word "Closed", conveniently provided upon the periphery of the disc 64, aligns itself with the binding post 85 and thereby indicates to the operator that the relationship of parts is that of Figures 6 and 11.

Furthermore, when all the elements of the device are assembled in the manner described, the arm 69 of the pivoted member is forced into the position indicated in Figure 2, the rounded free edge 70 resting against the rear surface of the flange 84. The function of this member will now be more fully appreciated, for an exertion of pressure upon the hand grip portion 68 to move it toward the handle 65, as indicated in Figure 9, will have a tendency to force the cutting tube 60, and all the parts within the latter, rearwardly out of the outer endoscopic tube 80.

Having thus described the structural nature and manner of assembly of my instrument, I will proceed to describe the method whereby the same may be employed for the treatment of a tumor mass or similar protrusion in a body cavity.

The parts having been assembled, one within the other, and suitable connections having been made to the rear of the device for furnishing illumination and irrigation, the entire instrument is inserted into the body cavity. By means of the illuminated vision afforded by the telescope, the operator is enabled to engage the protrusion to be treated, or any part thereof, within the fenestra 82. This relationship of parts is indicated most clearly in Figure 4, which represents the device in snug inserted position within a body cavity. It is to be noted that the protruding mass 90 is engaged within the fenestra 82. During this time, the impaling pin 51 is in a retracted position, such as the full-line position of Figure 8.

The protrusion having been engaged within the fenestra, the handle 52 of the impaling device is manipulated to cause the forward end of this device to pierce the protrusion longitudinally, thereby impaling the same in situ. This is a relatively simple procedure and is also conducted under illuminated vision, as will be understood. This step of the procedure is illustrated most clearly in Figure 5, the impaling pin having been advanced to a position approximating the dot-and-dash position of Figure 8.

Electrical connections having been made to the terminals in the handle 52 and the binding post or arm 85, a suitable electric current, preferably of high frequency, is caused to pass through the impaled protrusion, the impaling device serving as an active electrode and the endoscopic tube itself serving as the indifferent electrode. Where a proper generator of alternating current oscillations is employed, this electrical treatment may be conducted under a liquid medium, such as water, and it is carried out under illuminated vision.

After the electric cooking has been accomplished, a matter which will be readily observable by the experienced operator, the protruding mass will have been coagulated or cooked into a condition wherein its subsequent bloodless removal is a comparatively simple matter.

The excision is then accomplished by the operator by swinging the arm 65 through 180°, as previously described, this procedure being illustrated at the beginning and end thereof in Figures 10 and 11, and involving a transverse movement of one of the cutting edges 63 of the cutting tube across the fenestra of the endoscope. The cooked mass is thereby severed or cut away from the cavity wall, and the relationship of parts when this has been completed is illustrated in Figure 6. Cutting in this transverse manner is of great advantage in efficiently and expeditiously removing a protrusion from cavities which are substantially tubular, such as the urethra.

The final step in the procedure is to withdraw the excised mass rearwardly from the cavity from which it has been cut, and in carrying out this step of the process, the initial rearward withdrawal of the cutting tube and its associated parts is greatly facilitated by manipulation of the handle grip 68, as previously described. It will be understood that the purpose of the handle grip 68 and the arm 69 actuated thereby is simply to initiate this withdrawal so as to permit it to be accomplished in as gentle a manner as possible.

After the withdrawal has thus been initiated, the relationship of parts will be that of Figures 7 and 9, after which it is a comparatively simple matter for the operator to withdraw the entire cutting tube and all its associated parts rearwardly from the endoscopic tube 80. The latter remains within the cavity until after the excised mass has been removed, because in most cases the entire procedure is repeated so that a number of protrusions may be removed, or one tumor mass may be removed piece by piece. The repetition of the procedure for this purpose will be understood from the description given.

The advantages of my present method and of the instrument herein illustrated and described will be obvious to those skilled in the art. By its use, ailments of the character described may be alleviated and remedied in a highly efficient and simple manner, making the entire matter one of a minor operative nature, as distinguished from the serious major operations which have heretofore been resorted to under similar circumstances. Actual employment of the instrument and method has indicated that there is small risk involved; complications have so far failed to develop in any of a number of cases in which the method and instrument have been used; and hospitalization seems to be necessary for no more than about four days.

The employment of high-frequency current for the electric cooking processes described is highly advantageous since the operation is thereby rendered hemostatic.

It will be understood that the instrument and method may be employed for a variety of purposes and in a variety of ways to suit differing requirements and conditions and to comply with the desires or judgment of the particular operator or user.

It will also be understood that the cutting tube herein described and illustrated is merely a preferred form of construction and that, under certain circumstances, a transverse excision of the character mentioned may be efficiently accomplished by other means, as, for example, by means of a conductive wire or the like arranged to accomplish the same purpose as one of the cutting edges of the cutting tube illustrated and whose resecting capabilities are due to the passage of high-frequency or other electric current through it, the cutting capability of a wire being exemplified, e. g., in the case of the cutting accomplished by the loop of Stern in his Patent No. 1,679,950. It will also be understood that the use of the impaling device as an electrode, though highly advantageous and desirable, is not an absolute necessity, and that the protrusion may be electrically treated by means of current that is passed through it in other ways.

Furthermore, it will be understood that my invention does not necessarily involve the simultaneous or successive treatment of a protrusion with electric current and with a cutting medium. Under certain circumstances, the electric treatment may be dispensed with and the transverse excision alone resorted to. Similarly, conditions may arise under which electric or similar treatment of a protrusion in situ may be desirable without any accompanying resection. From another aspect, it is possible that, under certain circumstances, it may be desirable merely to impale the protrusion to engage the same firmly for certain treatments thereof.

In general, it will be obvious that changes in the details herein described and illustrated for the purpose of explaining the nature of my invention may be made by those skilled in the art without departing from the spirit and scope of the invention as expressed in the appended claims. It is therefore intended that these details be interpreted as illustrative, and not in a limiting sense.

Having thus described my invention and illustrated its use, what I claim as new and desire to secure by Letters Patent is—

1. In an instrument for treating a protrusion in a body cavity, a fenestrated endoscopic tube adapted to engage the protrusion in the fenestra, means for impaling said engaged protrusion, and means for applying an electric current to said protrusion through said impaling means.

2. In an instrument for electrically treating a protrusion of a body cavity, a fenestrated endoscopic tube serving as an indifferent electrode and adapted to engage the protrusion in the fenestra, an active electrode adapted to impale the engaged protrusion, and means for applying an electric current to said protrusion through said active electrode.

3. In an instrument for resecting a protrusion of a body cavity, a fenestrated endoscopic tube adapted to engage the protrusion in the fenestra, means for impaling said protrusion, means for applying an electric current to said protrusion through said impaling means so as to cook the engaged protrusion, and means for thereupon excising the cooked protrusion transversely of the cavity axis.

4. In an instrument for resecting a protrusion of a body cavity, a fenestrated endoscopic tube adapted to engage the protrusion in the fenestra, means for impaling said protrusion, means for applying an electric current to said protrusion through said impaling means so as to cook the engaged protrusion, and cutting means rotatably mounted adjacent to said fenestra for excising the cooked protrusion transversely of the cavity axis.

5. In an instrument for resecting a protrusion of a body cavity, a fenestrated endoscopic tube adapted to engage the protrusion in the fenestra, means for impaling said protrusion, means for applying an electric current to said protrusion through said impaling means so as to cook the engaged protrusion, and a cutting tube rotatably mounted in telescopic relation with the endoscopic tube and provided with a fenestra normally registering with that of the endoscopic tube, the edge of the cutting tube fenestra being sharpened so as to excise the protrusion transversely of the tube axes when the cutting tube is rotated.

6. In an instrument for treating a protrusion in a body cavity, a fenestrated endoscopic tube adapted to engage the protrusion in the fenestra, means for impaling said protrusion, means for applying an electric current to said protrusion through said impaling means so as to cook the engaged protrusion, and means for withdrawing the impaled and cooked protrusion rearwardly through the endoscopic tube.

7. In an instrument for resecting a protrusion of a body cavity, a fenestrated endoscopic tube adapted to engage the protrusion in the fenestra, means for impaling said protrusion, means for applying an electric current to said protrusion through said impaling means so as to cook the impaled protrusion, means for excising the cooked protrusion, and means for withdrawing the excised mass rearwardly through the endoscopic tube.

8. In an instrument for resecting a protrusion of a body cavity, a fenestrated endoscopic tube adapted to engage the protrusion in the fenestra, means for impaling said protrusion, means for applying an electric current to said protrusion through said impaling means so as to cook the engaged protrusion, a cutting tube rotatably and removably mounted in said endoscopic tube and provided with a sharp edge adjacent to the fenestra so that rotation of the cutting tube will excise the engaged and cooked protrusion, and means for gently initiating the rearward withdrawal of the cutting tube after the excision has been accomplished.

9. In an instrument for treatment of a protrusion in a body cavity, means insertable into said cavity for impaling the protrusion, and means for thereupon cooking the impaled protrusion by electric current applied through said impaling means.

10. In an instrument for treatment of a protrusion in a body cavity, an active attenuated electrode insertable into said cavity for impaling the protrusion, and means for applying electric current through said electrode to said impaled protrusion so as to cook the latter.

11. In an instrument for treatment of a protrusion in a body cavity, means insertable into said cavity for impaling the protrusion, means for cooking the impaled protrusion by electric current applied through said impaling means, and means for excising the cooked protrusion transversely of the cavity axis.

12. In an instrument for treatment of a protrusion in a body cavity, means insertable into said cavity for impaling the protrusion, means for cooking the impaled protrusion by electric current applied through said impaling means, means independent of the impaling means for cutting the cooked protrusion from the cavity wall, and means for simultaneously withdrawing from the cavity the impaling means, the cutting means, and the excised mass.

13. In the herein-described method of electrically cooking and excising a protrusion in a body cavity, the step which comprises impaling said protrusion with a cooking electrode.

14. In the herein-described method of resecting a protrusion in a body cavity, the step or steps which comprise impaling said protrusion and thereupon cooking the latter prior to excision thereof by electric current applied through the impaling means.

15. In the herein-described method of resecting a protrusion in a body cavity, the step or steps which comprise impaling said protrusion, cooking the latter by electric current applied through the impaling means, and then cutting the cooked mass from the cavity wall in a transverse direction relative to the cavity axis.

16. In an instrument for treatment of a protrusion in a body cavity, means insertable into said cavity for positively engaging the protrusion, means for cooking the engaged protrusion by electric current applied through said engaging means, means independent of the engaging means and movable with respect thereto for cutting the cooked protrusion from the cavity wall without releasing said engaging means from the protrusion, and means for simultaneously withdrawing from the cavity the engaging means, the cutting means, and the excised mass.

FREDERICK CHARLES WAPPLER.